United States Patent
Huang et al.

(10) Patent No.: US 11,508,984 B2
(45) Date of Patent: Nov. 22, 2022

(54) THIN FILM PATTERN LAYER BATTERY SYSTEMS

(71) Applicant: Apple Inc., Cupertino, CA (US)

(72) Inventors: Lili Huang, San Jose, CA (US); Richard M. Mank, Cupertino, CA (US)

(73) Assignee: Apple Inc., Cupertino, CA (US)

( * ) Notice: Subject to any disclaimer, the term of this patent is extended or adjusted under 35 U.S.C. 154(b) by 168 days.

(21) Appl. No.: 16/016,580

(22) Filed: Jun. 23, 2018

(65) Prior Publication Data

US 2018/0309155 A1    Oct. 25, 2018

Related U.S. Application Data

(63) Continuation of application No. 14/040,585, filed on Sep. 27, 2013, now Pat. No. 10,141,600.

(Continued)

(51) Int. Cl.
*H01M 10/04* (2006.01)
*H01M 10/42* (2006.01)
(Continued)

(52) U.S. Cl.
CPC ..... *H01M 10/0436* (2013.01); *H01M 50/116* (2021.01); *H01M 50/54* (2021.01); *H01M 10/044* (2013.01); *H01M 10/0585* (2013.01); *H01M 50/105* (2021.01); *H01M 2010/4278* (2013.01); *H01M 2220/30* (2013.01); *Y10T 29/49108* (2015.01)

(58) Field of Classification Search
CPC ............ H01M 10/0436; H01M 2/266; H01M 2/0267; H01M 2010/4278; H01M 2220/30; H01M 10/0562; H01M 10/0565; H01M 2300/0088; H01M 10/044; H01M 6/40; H01M 10/0585; H01M 50/105; H01M 50/54
See application file for complete search history.

(56) References Cited

U.S. PATENT DOCUMENTS 3,655,455 A    4/1972  Jones
4,369,225 A    1/1983  Manabe et al.
(Continued)

FOREIGN PATENT DOCUMENTS

CN    1144017    2/1997
CN    1262790    8/2000
(Continued)

OTHER PUBLICATIONS

"Polyetheretherketone (PEEK): A Complete Guide on High-Heat Engineering Plastic," Omnexus, pp. 1-8. (Year: 2021).*
(Continued)

*Primary Examiner* — Ula C Ruddock
*Assistant Examiner* — Matthew W Van Oudenaren
(74) *Attorney, Agent, or Firm* — Brownstein Hyatt Farber Schreck, LLP

(57) ABSTRACT

A battery assembly can be formed on a base layer provided on a substrate, with a thin film battery stack including an anode layer, a cathode layer, and an electrolyte layer between the anode and cathode layers. The thin film battery stack can be attached to a pattern film layer with holes for electrical connection to the anode and cathode layers.

16 Claims, 9 Drawing Sheets

Related U.S. Application Data

(60) Provisional application No. 61/801,013, filed on Mar. 15, 2013.

(51) Int. Cl.
*H01M 50/54* (2021.01)
*H01M 50/116* (2021.01)
*H01M 10/0585* (2010.01)
*H01M 50/105* (2021.01)

(56) References Cited

U.S. PATENT DOCUMENTS

| | | | |
|---|---|---|---|
| 5,134,046 A | 7/1992 | Chow et al. | |
| 5,523,179 A | 6/1996 | Chu | |
| 5,554,459 A | 9/1996 | Gozdz et al. | |
| 5,561,004 A | 10/1996 | Bates et al. | |
| 6,001,138 A | 12/1999 | Dix | |
| 6,180,278 B1 | 1/2001 | Prickett | |
| 6,200,634 B1 | 3/2001 | Johnsgard et al. | |
| 6,319,631 B1 | 11/2001 | Bay et al. | |
| 6,410,189 B1 | 6/2002 | Yamada et al. | |
| 6,610,572 B1 | 8/2003 | Takei et al. | |
| 6,632,563 B1* | 10/2003 | Krasnov | H01M 4/04 429/127 |
| 6,713,987 B2 | 3/2004 | Krasnov et al. | |
| 6,893,772 B2 | 5/2005 | Howard | |
| 7,285,334 B1* | 10/2007 | Yamashita | H01M 2/08 428/458 |
| 7,297,441 B2 | 11/2007 | Hatta et al. | |
| 7,585,582 B2 | 9/2009 | Chen | |
| 7,801,613 B2 | 9/2010 | Li et al. | |
| 7,927,744 B2 | 4/2011 | Mizutani et al. | |
| 7,931,989 B2 | 4/2011 | Klaassen | |
| 7,935,439 B2 | 5/2011 | Kim | |
| 7,939,195 B2 | 5/2011 | Salot et al. | |
| 7,959,769 B2 | 6/2011 | Zhang et al. | |
| 7,960,054 B2 | 6/2011 | Zhang et al. | |
| 8,044,813 B1 | 10/2011 | Dembo | |
| 8,153,301 B2 | 4/2012 | Jiang | |
| 8,168,322 B2 | 5/2012 | Krasnov et al. | |
| 8,293,402 B2 | 10/2012 | Lee et al. | |
| 8,323,828 B2 | 12/2012 | Yamazaki et al. | |
| 8,420,252 B2 | 4/2013 | Shakespeare et al. | |
| 8,431,264 B2 | 4/2013 | Neudecker et al. | |
| 8,435,312 B2 | 5/2013 | Chen | |
| 8,435,603 B2 | 5/2013 | Bentley et al. | |
| 8,445,130 B2 | 5/2013 | Neudecker et al. | |
| 8,475,955 B2 | 7/2013 | Krasnov et al. | |
| 8,518,581 B2 | 8/2013 | Neudecker et al. | |
| 8,518,583 B2 | 8/2013 | Mizuno et al. | |
| 8,580,332 B2 | 11/2013 | Kwak et al. | |
| 8,669,345 B2 | 3/2014 | Lee et al. | |
| 8,679,674 B2 | 3/2014 | Liang et al. | |
| 8,687,336 B2 | 4/2014 | Wang | |
| 8,822,059 B2 | 9/2014 | Wang | |
| 8,822,069 B2 | 9/2014 | Baek et al. | |
| 8,956,761 B2 | 2/2015 | Reynolds et al. | |
| 8,993,172 B2 | 3/2015 | Upadhyaya | |
| 9,083,048 B2 | 7/2015 | Wang et al. | |
| 9,209,451 B2 | 12/2015 | Fukushima | |
| 9,209,497 B2 | 12/2015 | Elian et al. | |
| 9,525,177 B2 | 12/2016 | Sturgeon et al. | |
| 9,570,775 B2 | 2/2017 | Huang et al. | |
| 9,601,751 B2 | 3/2017 | Huang et al. | |
| 9,711,770 B2 | 7/2017 | Anastas et al. | |
| 9,887,403 B2 | 2/2018 | Huang et al. | |
| 9,899,661 B2 | 2/2018 | Huang et al. | |
| 9,911,947 B2 | 3/2018 | Hong | |
| 2001/0032666 A1 | 10/2001 | Jenson et al. | |
| 2002/0110733 A1* | 8/2002 | Johnson | H01M 10/0562 429/149 |
| 2002/0127362 A1 | 9/2002 | Jansen et al. | |
| 2003/0129379 A1* | 7/2003 | Yao | B29C 41/12 428/308.4 |
| 2003/0180621 A1 | 9/2003 | Matsumoto | |
| 2003/0232248 A1* | 12/2003 | Iwamoto | H01M 4/66 429/233 |
| 2005/0079418 A1 | 4/2005 | Kelley et al. | |
| 2005/0211313 A1 | 9/2005 | Sherman et al. | |
| 2005/0250010 A1 | 11/2005 | Kurihara et al. | |
| 2006/0127760 A1* | 6/2006 | Hatta | B29C 66/83221 429/185 |
| 2006/0210880 A1 | 9/2006 | Howard et al. | |
| 2007/0238019 A1* | 10/2007 | Laurent | H01M 10/0436 429/163 |
| 2008/0032236 A1 | 2/2008 | Wallace | |
| 2009/0193649 A1 | 8/2009 | Niessen et al. | |
| 2009/0208754 A1 | 8/2009 | Chu et al. | |
| 2009/0317708 A1 | 12/2009 | Brandl et al. | |
| 2010/0035152 A1 | 2/2010 | Sastry et al. | |
| 2010/0066683 A1 | 3/2010 | Chang et al. | |
| 2010/0261067 A1* | 10/2010 | Pitts | H01M 10/0585 429/323 |
| 2011/0123844 A1 | 5/2011 | Bhardwaj et al. | |
| 2011/0177398 A1 | 7/2011 | Affinito et al. | |
| 2011/0183183 A1 | 7/2011 | Grady et al. | |
| 2011/0195271 A1 | 8/2011 | Zadesky et al. | |
| 2011/0200868 A1 | 8/2011 | Klaassen | |
| 2011/0274974 A1* | 11/2011 | Sabi | H01M 10/0562 429/220 |
| 2011/0294015 A1 | 12/2011 | Pirk et al. | |
| 2012/0028089 A1 | 2/2012 | Mustakallio | |
| 2012/0088151 A1* | 4/2012 | Yamazaki | H01M 4/5825 429/211 |
| 2012/0135288 A1 | 5/2012 | Meintschel | |
| 2013/0029205 A1 | 1/2013 | Adams | |
| 2013/0260214 A1* | 10/2013 | Ueda | H01M 10/0585 429/162 |
| 2014/0007418 A1 | 1/2014 | Song | |
| 2014/0011067 A1 | 1/2014 | Baba et al. | |
| 2014/0147731 A1 | 5/2014 | Anastas et al. | |
| 2014/0147737 A1 | 5/2014 | Anastas et al. | |
| 2014/0147742 A1 | 5/2014 | Anastas et al. | |
| 2014/0264915 A1 | 9/2014 | Huang et al. | |
| 2014/0265915 A1 | 9/2014 | Huang et al. | |
| 2014/0272190 A1 | 9/2014 | Huang et al. | |
| 2014/0272541 A1 | 9/2014 | Huang et al. | |
| 2014/0272560 A1 | 9/2014 | Huang et al. | |
| 2014/0272561 A1 | 9/2014 | Huang et al. | |
| 2014/0273890 A1 | 9/2014 | Huang et al. | |
| 2015/0325862 A1 | 11/2015 | Song et al. | |
| 2016/0064719 A1 | 3/2016 | Bushnell et al. | |
| 2016/0093837 A1 | 3/2016 | Bushnell et al. | |
| 2017/0309882 A1 | 10/2017 | Anastas et al. | |

FOREIGN PATENT DOCUMENTS

| | | |
|---|---|---|
| CN | 1153311 | 6/2004 |
| CN | 101640968 | 2/2010 |
| CN | 101676845 | 3/2010 |
| CN | 103094512 | 5/2013 |
| EP | 0792741 | 9/1997 |
| EP | 0975031 | 1/2000 |
| EP | 1804315 | 7/2007 |
| EP | 2105983 | 9/2009 |
| EP | 2481499 | 8/2012 |
| JP | 61032951 | 2/1986 |
| JP | 63314770 | 12/1988 |
| JP | 2013004173 | 1/2013 |
| JP | 2013021347 | 1/2013 |
| TW | I 306319 | 2/2009 |
| TW | 201010094 | 3/2010 |
| TW | 201014020 | 4/2010 |
| TW | 201108441 | 3/2011 |
| TW | 201218494 | 5/2012 |
| WO | WO 08/007867 | 1/2008 |
| WO | WO 10/033609 | 3/2010 |
| WO | WO 12/086557 | 6/2012 |
| WO | WO 12/090929 | 7/2012 |
| WO | WO 12/114162 | 8/2012 |

(56) References Cited

FOREIGN PATENT DOCUMENTS

| WO | WO2013031195 | * | 3/2013 |
| WO | WO2018/108713 | | 6/2018 |
| WO | WO2019/163550 | | 8/2019 |

OTHER PUBLICATIONS

"Lithium ion cells—Material Safety Data Sheet," Maxell, pp. 1-4. (Year: 2021).*

Zhonghua et al., "Layered Cathode Materials Li [$Ni_xLi_{(1/3-2x/3)}Mn_{(2/3-x/d)}$]$O_2$ for Lithium-Ion Batteries," Electrochemical and Solid-State Letters, vol. 4, No. 11, 2001, pp. A191-A194.

* cited by examiner

THIN FILM PATTERN LAYER BATTERY SYSTEMS

CROSS-REFERENCE TO RELATED APPLICATIONS

This application is a continuation of U.S. patent application Ser. No. 14/040,585, filed Sep. 27, 2013, and entitled "Thin Film Pattern Layer Battery Systems," which claims the benefit under 35 U.S.C. § 119(e) of U.S. Provisional Patent Application No. 61/801,013, filed Mar. 15, 2013, entitled "Thin Film Pattern Layer Battery Systems," the contents of which are incorporated by reference as if fully disclosed herein.

FIELD

The subject matter of this disclosure relates generally to battery systems, and in particular to battery systems suitable for a range of different electronics applications including, but not limited to, computer systems, portable electronics and mobile devices. More specifically, the disclosure relates to battery systems and related methods of manufacture, utilizing pattern layer techniques to provide improved energy storage and performance.

BACKGROUND

Battery systems are utilized in a wide range of electronics applications, including computers, mobile devices, media players, personal digital assistants, power tools, navigational and communications equipment, and power storage and management systems for automotive, rail, shipping and industry use. Depending on application, these systems are traditionally configured around a cellular anode and cathode battery structure, for example in a cylindrical rod-and-tube type dry cell or flat plate flooded cell design. More advanced battery systems may utilize a "Jelly roll" or "Swiss roll" configuration, in which the anode and cathode layers are provided on opposite sides of a flat sheet or flexible substrate, which can be rolled up folded inside a battery pouch or enclosure.

Battery system design is driven by a number of competing factors, including size, weight, energy capacity, storage density, cost, safety, reliability, durability, and ease of manufacture. In rechargeable battery systems, thermal loading, recharge rate and other cycling considerations may also be important concerns, particularly as they relate to service life and suitability for particular electronics applications. These design and engineering factors may also be weighted differently based on intended usage, for example as directed to larger scale battery systems for transportation and industrial power systems, as compared to smaller scale batteries for computers and consumer electronic devices.

As a result, there is a continual need for improved battery system designs, with increased service life and performance over a wide range of different operational configurations and demands. In particular, there is a need for improved thin film, laminar, and encapsulated battery technologies, with increased energy capacity and storage density suited to the ever-increasing service requirements of modern electronics and power system environments.

SUMMARY

Exemplary embodiments of the disclosure include battery systems, methods of making battery systems, and electronic devices utilizing battery systems. The battery systems include anode and cathode layers having one or more thin film pattern layer structures.

Representative processing methods may include forming a base layer on a temporary or process substrate layer, and forming a thin film battery stack on the base. The battery stack may include an anode layer, a cathode layer, and an electrolyte layer between the anode and cathode. The battery stacks can also be laminated together with a patterned film, where the patterned film has pattern holes positioned for coupling to electrodes or electrical power connectors.

Depending on application, the battery stack may be thermally processed on the process substrate in order to generate a phase transition in the cathode layer, for example a crystal phase transition. The thin film battery stack can then be transferred to a pattern layer or other substrate, which is not necessarily subject to the phase transition temperature.

The process substrate can be removed by an etching process stopped by the base layer, for example using a silicon-based etch blocking layer. Alternatively, the base layer can also be removed, for example by laser ablation or a mechanically process, or using an excimer laser to generate a phase transition in the base layer, in order to release the battery stack from the process substrate.

In stacked battery applications, a number of thin film battery cells are stacked for assembly into the battery system. For example, each stack may include a cathode collector layer adjacent the cathode layer, and adjacent cells can be inverted so that the cathode collector layers are electrically coupled within the battery assembly. Alternatively, bare cathode or anode layers can be stacked adjacent to one another, and a conducting adhesive can be used to form the collector layers. The battery cells can also be encapsulated, for example using a polymer or organic film.

In battery system applications, a number of thin film battery cells may be arranged in a stacked configuration, where each of the cells includes an anode layer, a cathode layer, and an electrolyte layer between the anode and cathode layers. A patterned film can also be bonded to the battery stack or multilayer cell structure, with pattern holes positioned for electrical connections to the anode and cathode layers, or the corresponding collectors.

The cathode layers may have a crystalline structure characterized by a crystalline phase transition temperature, and the thin film battery cells may be transferred to a target substrate material (e.g., after processing), which is not necessarily thermally stable at the crystalline phase transition temperature. The cells include anode and cathode collector layers, which can be positioned in an adjacent and electrically coupled relationship within the stacked configuration. Alternatively, the bare cathode and anode layers may be coupled together, for example using a conducting bond to form the collector. Suitable encapsulants can be formed of organic liquid and polymer materials.

These battery systems can be utilized in electronic devices, for example a smartphone, tablet computer, or other mobile device. In these applications, a battery assembly is typically coupled to a controller, and configured to power a display. The assembly itself includes a number of thin film battery cells arranged in a stacked configuration, where each of the thin film battery cells has an anode, cathode, and electrolyte layer. The patterned film layer can be bonded to the thin film battery stack, with pattern holes positioned to provide electrical access to the anode and cathode structures.

DETAILED DESCRIPTION

This disclosure is directed to battery systems and assemblies for electronic devices and power management systems. The batteries can be formed in a thin film transfer process, for example by forming a base layer on temporary substrate, and forming a battery stack on the base layer. The battery stack is processed on the temporary substrate, which can be relatively thick, and designed to withstand the high crystal phase transitions characteristic of lithium ion battery production.

Suitable thin film transfer processing techniques include, but are not limited to, those described in METHOD FOR TRANSFERRING THIN FILM TO SUBSTRATE, U.S. Publication No. 2010/0066683, published Mar. 18, 2010, the entirety of which is incorporated by reference herein. After processing, the battery stack can be transferred to a more permanent and substantially thinner target substrate, increasing potential energy density in the final battery assembly.

The target substrate does not require the same high-temperature thermal stability properties as the process substrate, providing for a much wider range of possible materials. For example, a patterned film substrate may be used, with pre-cut openings or pattern holes for access to the anode and cathode collectors in the battery stack. The battery stacks can also be assembled into a multi-cell battery system, with or without permanent substrate layers. Depending on stacking configuration, the anode and cathode collectors layers may be eliminated, or replaced with a conducting adhesive, decreasing the inactive mass and increasing power and performance, within a given form factor or size and weight envelope.

Figure 1A:
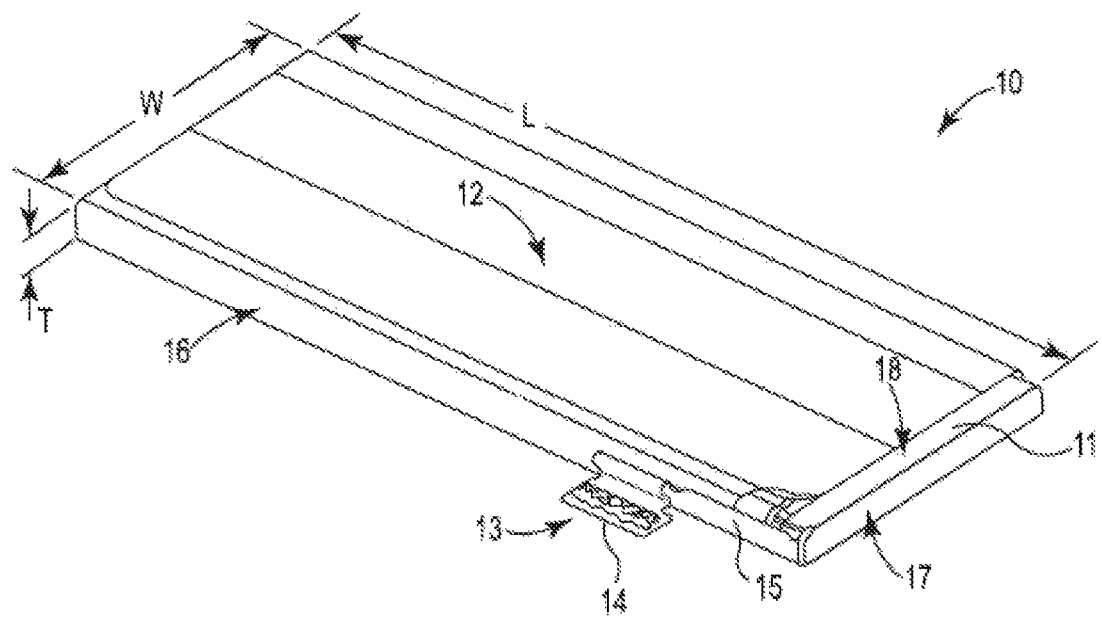
FIG. 1A is a perspective view of a battery system with improved thin film, laminar and/or encapsulation structures for increased energy density, as described herein.

FIG. 1A is a perspective view of a battery (or battery system) 10 with improved thin film, laminar and/or encapsulation structures. These structures provide battery system 10 with increased energy density for improved service life and performance, suitable for a range of different electronic and power system applications, as described herein.

As shown in FIG. 1A, battery system 10 is provided as a laminated anode/cathode structure within enclosure 11, for example a battery pouch, casing or encapsulation layer. Protective film wrap 12 may be provided over battery enclosure 11 to protect battery 10 during shipping and storage. Film wrap 12 can also include a label, barcode, or other informational indicia for inventory control, which is typically removed before insertion of battery system 10 into an electronic device.

One or more connectors 13 provide power, sensor and control connections to battery system 10, for example in a "pigtail" configuration with a connector board or manifold 14 coupled to battery system 10 via flex circuit 15. The flex circuit connection can be made through a side 16 or end 17 of battery enclosure 11, as shown in FIG. 1A, or a major surface 18 (e.g., top or bottom surface) of enclosure 11. Flex circuit 15 also allows the connector board or manifold 14 to be relocated away from battery enclosure 11 during installation and removal, and for wrapping and unwrapping of protective film 12.

Length L, width W and thickness T of enclosure 11 define the shape or form factor of battery 10, typically excluding protective wrapper 12 and any other components that are removed before installation. In the particular configuration of FIG. 1A, for example, battery system 10 has a substantially rectangular or oblong form factor, with width W defined between opposite sides 16 of enclosure 11, and length L defined between opposite ends 17. Thickness T is typically defined between the major surfaces of battery 10, for example between the bottom of battery enclosure 11 and top surface 18.

Figure 1B:
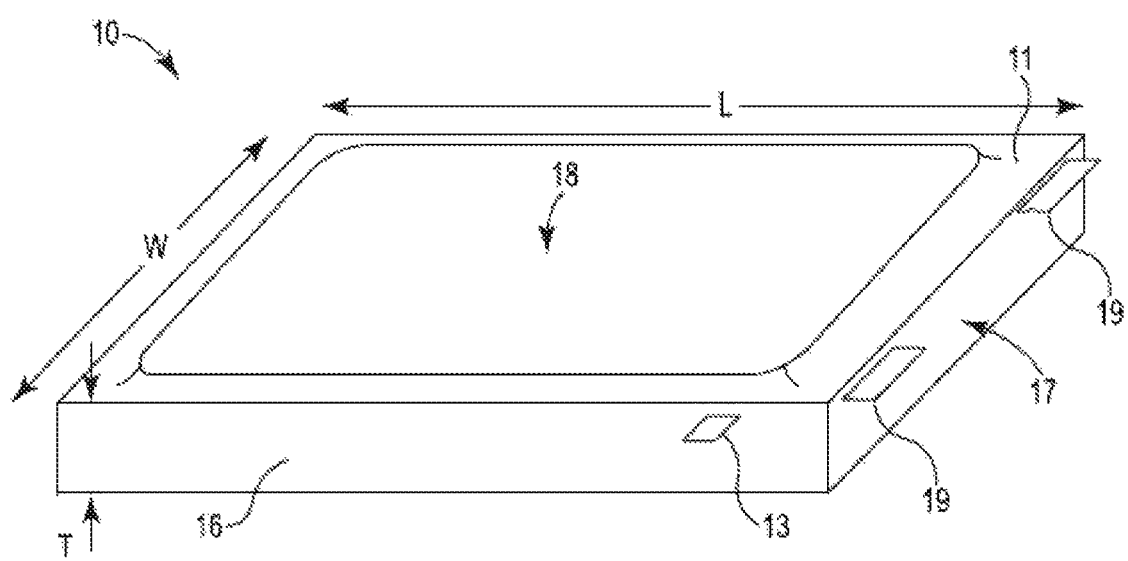
FIG. 1B is a perspective view of the battery system, with an alternate form factor.

FIG. 1B is alternate perspective view of battery system 10, with a different form factor. In this configuration, battery thickness T is relatively greater, as compared to the thin-profile embodiment of FIG. 1A, and as a fraction of battery length L and width W. This may provide battery system 10 with greater storage capacity, within a given area L×W, in exchange for more weight and a larger volume envelope. Battery system 10 may also utilize a three-connector configuration, as shown in FIG. 1B, with control or sensor connector 13 and separate (e.g., positive and negative) electrodes 19 for charging and power delivery.

Enclosure 11 is sometimes formed of a laminated pouch structure, for example using a relatively thin or flexible metal such as aluminum or steel, sandwiched between polymer protective layers or other coatings. Alternatively, enclosure 11 may be formed as a rigid case, using a relatively thicker metal or plastic material, or as an encapsulation layer or encapsulated enclosure system, as described below. In advanced battery systems, the internal structure (or battery core) of battery system 10 may be formed as a thin film or laminated anode/cathode structure. In particular, a thin film lithium ion battery structure may be utilized, in order to provide increased potential energy density and a higher power/weight ratio for battery system 10.

To achieve these advantages, the proportion of active battery materials should be increased or maximized, including lithium ion utilization in the cathode layers, as compared to inactive materials and "overhead," which should be decreased or minimized. To achieve high lithium ion utilization, particular crystalline structures or orientations may also be selected. For example, a substantially uniform or single-crystal structure may provide greater energy density in the cathode layers, as compared to a more amorphous structure. In addition, particular crystal plane orientations may be preferred, for example a (104), (101) or (012) crystal plane orientation, as compare to other possible orientations, such as (003).

In order to produce the desired crystal structures, the thin film battery layers are typically subjected to heating and other physical and chemical processes after deposition, in order to achieve the desired phase transitions. For example, both the film battery layers and the substrate may be heated to relatively high temperatures of up to 700 C or more, for extended periods of time, in order to achieve thermal crystallization. Thus, the process substrate must be thermally, chemically and mechanically stable, even at high temperatures. This requirement tends to limit the selection of suitable substrate materials, raising costs and reducing design options.

To address this problem, battery system 10 may utilize a thin film transfer process, in which the battery layers are deposited and processed on a temporary or process substrate material, then transferred to a new (permanent) substrate, or into a battery stack, after the desired phase transformations have been achieved. This technique reduces the more stringent process requirements on the permanent substrate material, allowing for a wider range of design choices directed to performance and cost effectiveness of the final battery system 10, rather the processing of individual battery stacks.

This approach also reduces or minimizes overhead and inactive materials. Flexible substrates, for example, are typically fabricated in roll-to-roll form, where each roll may be 1-2 meters wide, and up to thousands of meters long. In order to withstand typical jelly roll (and other standard battery) processing techniques, however, a minimum substrate thickness must be maintained. For example, up to 25 μm thick substrates may be utilized in display panel and touch screen applications, while the typical active layer thicknesses may be as low as 3-5 μm. Actual production parameters vary, but representative numbers suggest a potential material overhead of 500% or more, based on the substrate thickness, as compared to the active (e.g., cathode) layers. Thin film transfer techniques can be used to substantially reduce this overhead, increasing the active material fraction and corresponding potential energy density, as described below.

Figure 2:
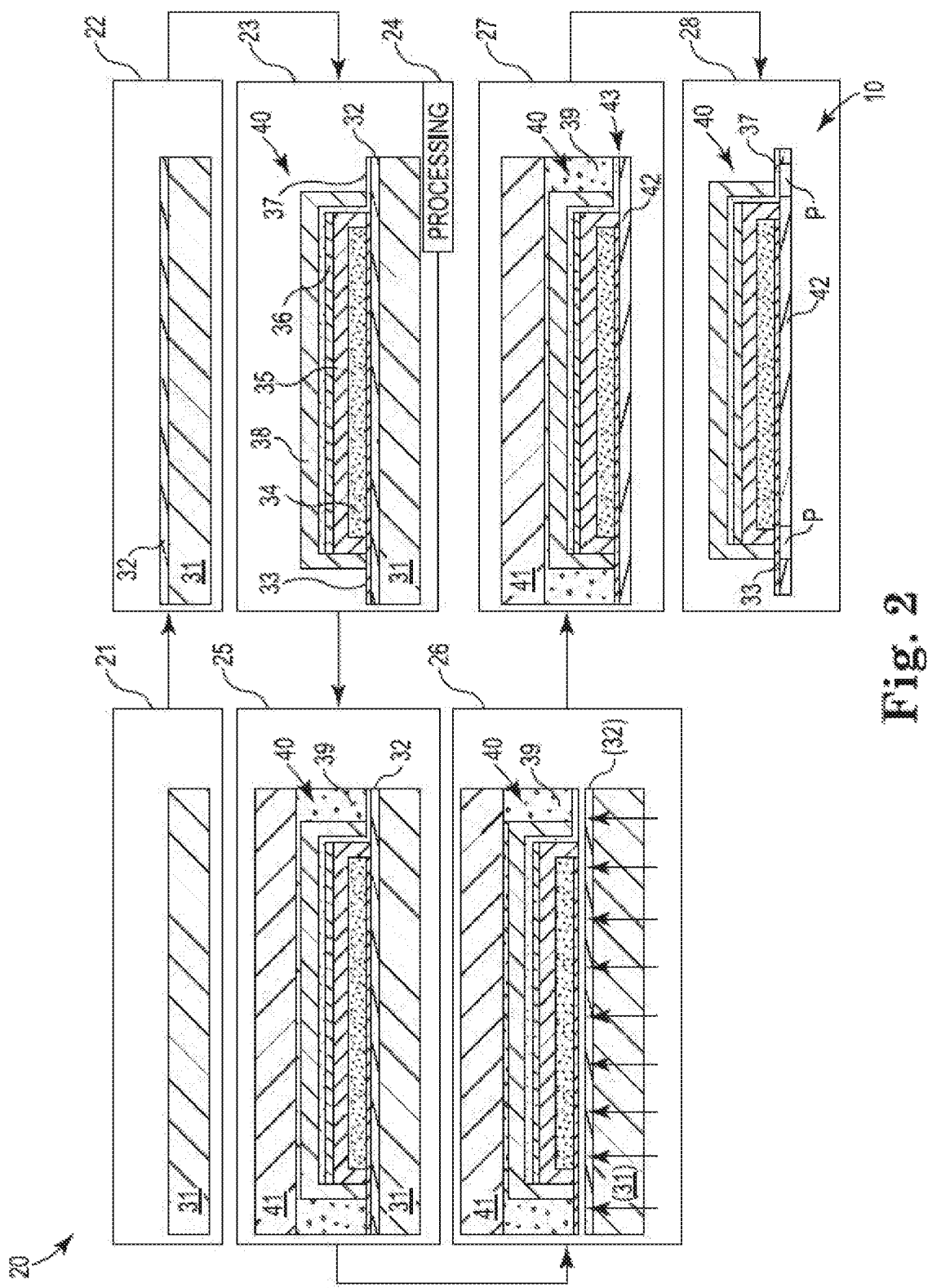
FIG. 2 is a process flow diagram for making a battery system or battery assembly, utilizing a temporary process substrate layer.

FIG. 2 is a flow diagram illustrating a representative method or process 20 for producing a battery stack 40, utilizing a thin film transfer technique. Method 20 may utilize one or more steps including, but not limited to, providing a temporary or process substrate (step 21), providing a sacrificial release or base layer on the process substrate (step 22), forming battery layers in a stack on the base layer (step 23), processing the battery stack (step 24), attaching the battery stack to a transfer plate (step 25), releasing the process substrate (step 26), transferring the battery stack to a permanent substrate (step 27), and removing the transfer plate (step 28). Process method 20 may thus be utilized to form one or more thin film battery stacks or cells 40 for use a battery assembly such as battery system 10, above.

In step 21, process substrate or carrier layer 31 is provided in the form of a glass wafer or other suitable process substrate material 31. Generally, the composition and thickness of process substrate 31 are selected for thermal, chemical and mechanical stability and tolerance under the potentially harsh battery processing conditions of processing method 20. In addition, the thickness of process substrate 31 is not substantially limited by overhead and inactive material considerations, because the battery stack is transferred from process substrate 31 before final battery assembly, as described below.

In step 22, release or base layer 32 is provided on process substrate 31. Base layer 32 may be formed, for example, of a silicon base or etch stopping material on which the battery layers are formed, and which is retained when process substrate 31 is removed. A seed layer or seed material may also be provided, in order to encourage a particular crystal plane orientation in an adjacent anode, cathode or collector layer, for example a lithium cobalt (LiCo) seed layer for forming a lithium cobalt cathode or cathode collector with a selected crystal plane structure. Base layer 32 can also be provided as a sacrificial layer, which is removed from the final battery assembly to release process substrate 31, or as a base layer, which is retained in the final battery assembly.

In step 23, laminar battery stack 40 is formed on base layer 32 and process substrate 31, for example using thin film deposition and masking techniques. In particular, battery stack 40 is formed of one or more battery layers selected from the following: cathode current collector layers 33, cathode layers 34, electrolyte layers 35, anode layers 36, and anode collector layers 37.

Suitable anode and cathode layer materials include, but are not limited to, lithium, lithium cobalt oxide, lithium iron phosphate and other lithium metal phosphates, lithium manganese oxide, carbon, and graphite, or graphite infused with lithium ions. In one particular configuration, for example, anode layer 36 may be formed of lithium, and cathode layer 34 may be formed of lithium cobalt oxide. Alternatively, anode layer 36 may be formed of lithium cobalt oxide, or another lithium phosphate or metal oxide material, and cathode layer 34 may be formed of graphite, or lithium ion infused graphite, or a lithium-based material.

Suitable materials for electrolyte layer 35 include, but are not limited to, ethylene carbonate and diethyl carbonate containing lithium ion complexes, and other (e.g., acid or alkali) electrolytes having suitable ion transport properties. In lithium ion applications of battery 10, the electrolyte is typically non-aqueous, in order to avoid reacting with lithium metal components in the anode and cathode layers. A separator material may also be provided in electrolyte layer 35, for example a porous or microporous ion transport material, a glassy or thin film solid electrolyte separator, or a paper, polymer, or fibrous composite membrane material with selected ion transport properties. Suitable electrolyte and separator materials also include, but are not limited to, polyethylene lithium ion transport materials, lithium phosphate, lithium phosphorous, and lithium phosphorous oxynitride (LiPON or LiPOxNy) materials, polymer, carbon (e.g., carbon nanotube) and composite membrane materials, and lithium-salt type electrolytes in a substantially solid polymer composite, for example in a lithium polymer battery configuration.

The particular configuration of battery stack 40 is merely representative, and the number and order of the individual anode, electrolyte, cathode and collector layers 33-37 may vary. For example, the layers may be reversed or inverted with respect to base layer 32 and process substrate 31, and collector layers 33 and 37 may be provided either as separate metal or conduction layers, or combined with the anode and cathode layers. Depending on the charging or discharging state, moreover, the charge flow in anode and cathode layers 36 and 34 may be reversed, and these designations may be modified accordingly, without loss of generality.

In step 24, battery stack 40 is processed to obtain selected material properties. For example, battery stack 40 may be heat treated to obtain crystallization or another phase change in cathode layer 34, or in other layers of battery stack 40. Generally, the crystallization temperature may be relatively high, for example up to 700 C or more. In applications where a seed layer or seed material is provided, the crystallization temperature may be somewhat lower, for example about 400 C or above. In additional examples, the relevant phase change temperature varies, depending upon the desired properties of battery stack 40, and the corresponding material composition and configuration of battery layers 31-37.

Processing step 24 may also include encapsulation of battery stack 40 within encapsulation layer 38. Encapsulation layer 38 provides a relatively thin, electrically insulating, chemical and mechanical barrier for battery stack 40, protecting from environmental effects including electrical contact, mechanical stress, and moisture intrusion.

Encapsulation layer 38 may be provided before or after heating and other processing steps on battery stack 40. For example, suitable materials for encapsulation layer 38 include ceramics and other high temperature or refractory materials, which may be applied before or after thermal crystallization of cathode layers 34 (or anode layers 36). Additional suitable materials include polymer coatings and epoxy resins, for which the application sequence may depend upon the processing temperature and heating time, as compared to the thermal stability of the encapsulating material.

In transfer step 25, battery stack 40 is bonded to a transfer plate or transfer layer 41, for example using an easy release adhesive or other releasable bonding material 39. Suitable materials for transfer layer 41 include, but are not limited to, flexible polymer materials such as polyethylene terephthalate (PET) and other flexible polymers, and rigid materials such as glass, and silicon wafer materials. Suitable materials for adhesive or bonding material 39 include soluble glues and adhesive, which can be selected to temporarily adhere battery stack 40 to transfer layer 41, and which can later be dissolved or otherwise removed.

In release step 26, process substrate 31 is removed or released and battery stack 40 is transferred to transfer layer 41. Depending upon application, base layer 32 may also be removed, for example when using a sacrificial release material. Alternatively, base layer 32 can also be retained in the final battery assembly. For example, a chemical etching process may be utilized, which is stopped by base layer 32 as formed with an etch-resistant material, such as silicon. Alternatively, a sacrificial base or release layer 32 may be used, which undergoes a phase change when subject to an additional processing step, for example using an XeCl excimer laser or other radiation source to crystallize an amorphous silicon base layer 32. Base layer 32 can also be ablated, or vaporized in an annealing process or other heat treatment. Depending on removal technique, moreover, process substrate layer 31 may either be destroyed, or preserved for reuse in a subsequent processing method 20.

In step 27, battery stack 40 is attached to the target or permanent (intended) substrate 42, for example using an adhesive layer 43 laminated between the bottom of battery stack 40 (e.g., cathode collector layer 33, and/or other battery layers), and target substrate 42. Suitable materials for adhesive layer 43 include, but are not limited to, permanent adhesives such as thermosetting adhesives, epoxy adhesives, and radiation-cured adhesive materials, and other bonding agents. In additional applications, target substrate 42 may be provided in the form of a patterned film, which can be laminated onto battery stack 40, or onto a thin film stackup including multiple battery cells 40. Thin film type target substrates 42 can be precut or patterned with pattern holes or apertures P, in order to provide access to anode and cathode collector layers 37 and 33, as shown in step 28, and in order to make power connections between the battery stacks and the assembled battery system 10.

In step 28, transfer plate (or layer) 41 is removed, for example by dissolving or otherwise removing temporary adhesive layer 39. After completion of processing method 20, battery stack 40 is released from process substrate 31 (and transfer layer or plate 41), and battery stack 40 can be bonded to permanent or target substrate 42. One or more individual battery stacks 40 may then be utilized in a battery system 10, for example in a stacked arrangement inside a battery enclosure 11, as shown in FIGS. 1A and 1B. Alternatively, the battery enclosure may incorporate an encapsulation layer 38 and the target substrate 42, for example in an encapsulated patterned film embodiment, or as described below.

Based on the particular processing steps of method 20, target substrate 42 is not subject to the same (e.g., high temperature and/or harsh chemical) processing steps as battery stack 40, and target substrate 42 does not necessarily require the same chemical, mechanical, and thermal stability properties as process substrate 31. Thus, target substrate 42 may be formed from a wider range of materials that are selected for performance within a particular battery system 10, independent of the processing steps utilized to produce battery stack 40. In particular, suitable materials for target substrate 42 may include plastics and other polymers, as well as various metals as well as higher temperature glass and ceramic or refractory materials.

In addition, the thickness of target substrate 42 may also be selected based on battery performance considerations, rather than the processing requirements of battery stack 40. Thus, target substrate 42 may be substantially thinner than a typical battery substrate, for substantially less than 25 µm, as described above for more traditional battery designs. Depending on application, the thickness of target substrate 42 may also be less than about 20 µm, for example about 10-20 µm, or less than about 10 µm, for example about 5-10 µm.

This reduced thickness for target substrate 42 results in a battery system 10 with substantially more active material, as a fraction of total battery height, and provides a corresponding increase in potential energy density and storage capacity, as compared to other battery systems with similar overall dimensions, but larger substrate thicknesses. In very thin substrate applications, moreover, the thickness of target substrate 42 may be even less, for example about 5 µm or less, or about 2-3 µm, providing a further increase in battery capacity and performance.

Figure 3:
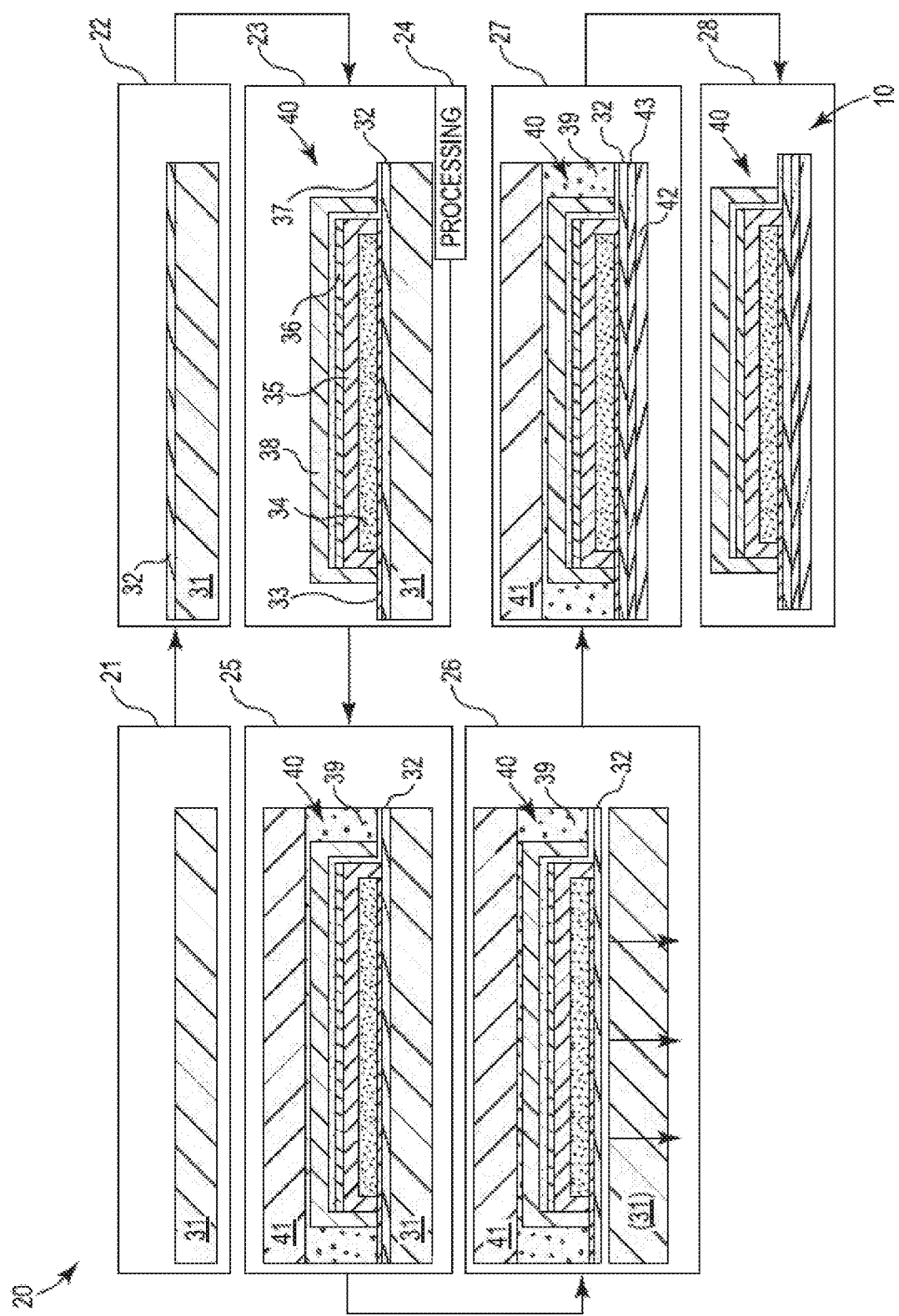
FIG. 3 is a process flow diagram for a battery system or assembly, utilizing an etched substrate and permanent base layer.

FIG. 3 is a process flow diagram illustrating method 20 for producing battery stack 40, in an alternate technique with a permanent base layer 32. In this example, processing steps 21, 22, 23, 24, and 25 may be similar to those of FIG. 2, above, or other thin film techniques may be used, as known in the art. In step 26, process substrate 31 is released or removed, for example by etching, and base layer 32 is retained as a permanent base layer for battery stack 40.

In this example, base layer 32 may be provided in the form of a silicon etch block or base layer, as described above, with or without a seed layer for generating a particular crystal plane orientation in one or more thin film battery layers 33-37. After processing battery stack 40 to provide the desired crystalline structure and other material properties, process substrate layer 31 can be etched away, leaving thin film battery stack attached to base layer 32. Alternatively, a mechanical process such as grinding can be used, avoiding the harsh chemical environment typically associated with etching.

In step 27, battery stack 40 is attached to target substrate 42, for example using a layer of permanent adhesive 43 to bond base layer 32 to target substrate 42. In step 28, temporary adhesive 39 and transfer layer 41 are removed, preparing battery stack 40 for use in a battery system 10, as described above.

Figure 4:
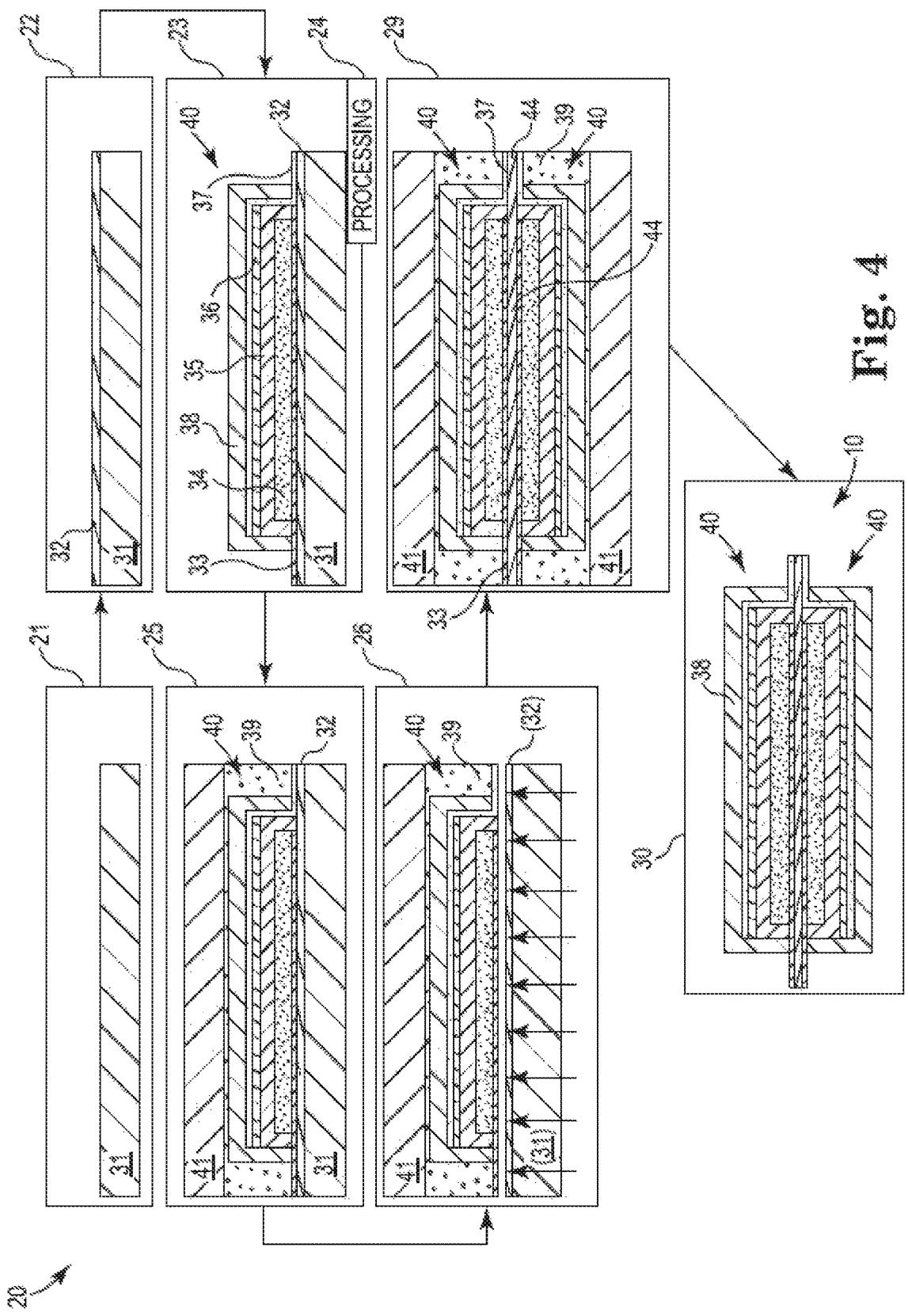
FIG. 4 is a process flow diagram for a battery system or assembly, in a stacked cellular design.

FIG. 4 is a process flow diagram illustrating method 20 for processing a plurality of battery stacks 40, in a multiple stacked cell design. In this example, processing steps 21-25 may also be similar to those described above, with base layer 32 provided in the form of a sacrificial release layer, which is removed along with process substrate layer 31 in release step 26. Instead of bonding battery stack 40 directly to a target substrate, however, a number of battery stacks 40 are assemble into a multi-cell stack configuration, as shown in step 29.

Adjacent battery stacks 40 may also be inverted with respect to one another, with a layer of conducting adhesive 44 provided between adjacent cathode layers 34 or cathode collectors 33 (or both), forming a single cathode connector 33 for two adjacent battery stacks 40. Alternatively, a non-conducting adhesive may be used, with separate (e.g. parallel) electrical connections between individual cathode collector layers 33.

The order of individual thin film battery layers 33-37 can also be reversed or otherwise modified in individual battery stacks 40, so that conducting adhesive 44 (or an insulating bonding agent) is provided between adjacent anode layers 36 and/or anode collectors 37. A variety of different electrode couplings are also contemplated, for example with anode collectors 37 and cathode collectors 33 exiting from opposites sides of the stacked battery cell assembly, with additional conductive adhesive 44 between adjacent portions of the respective collector layers.

In step 30, temporary adhesive 39 and transfer layers 41 are removed (see step 28, above), and stacked battery cells 40 are provided for use in a battery system 10. Additional battery stacks or cells 40 may also be added, to provide a multi-cell stacked battery design with an arbitrary number of battery stacks 40. One or more substrate layers 42 and encapsulation layers 38 may also be included at the top or bottom of the individual battery cell stacks 40, or eliminated altogether, depending upon the desired chemical and mechanical properties of battery system 10.

Figure 5:
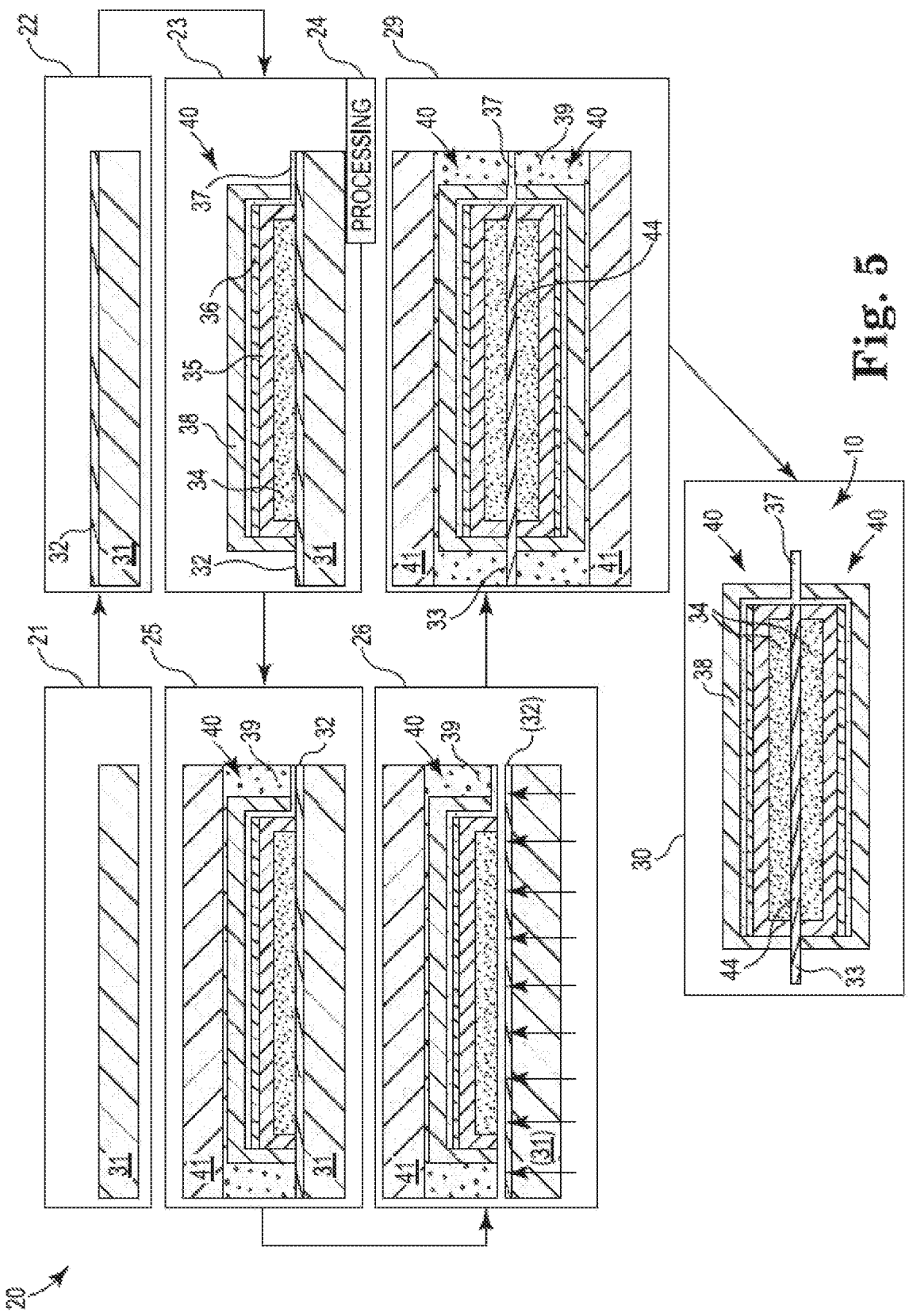
FIG. 5 is a process flow diagram for a battery system or assembly, with a conducting adhesive collector layer.

FIG. 5 is a process flow diagram illustrating method 20 for processing multiple layered battery stacks or cells 40, with a conducting adhesive cathode collector layer 33. In this example, no separate cathode collector layer is formed in battery stack 40 (step 23), and both process substrate 31 and base (or release) layer 32 are removed (step 26), before bonding adjacent (inverted) battery stacks 40 (step 29).

Thus, conductive adhesive 44 is provided directly between adjacent cathode layers 34, and serves as both a bonding layer and a cathode current collector, as shown in step 28. This design eliminates the need for conventional separate or distinct cathode collector layers, reducing battery height (or z-height) without removing active materials, and further increasing the potential energy density, with respect to other designs.

Figure 6:
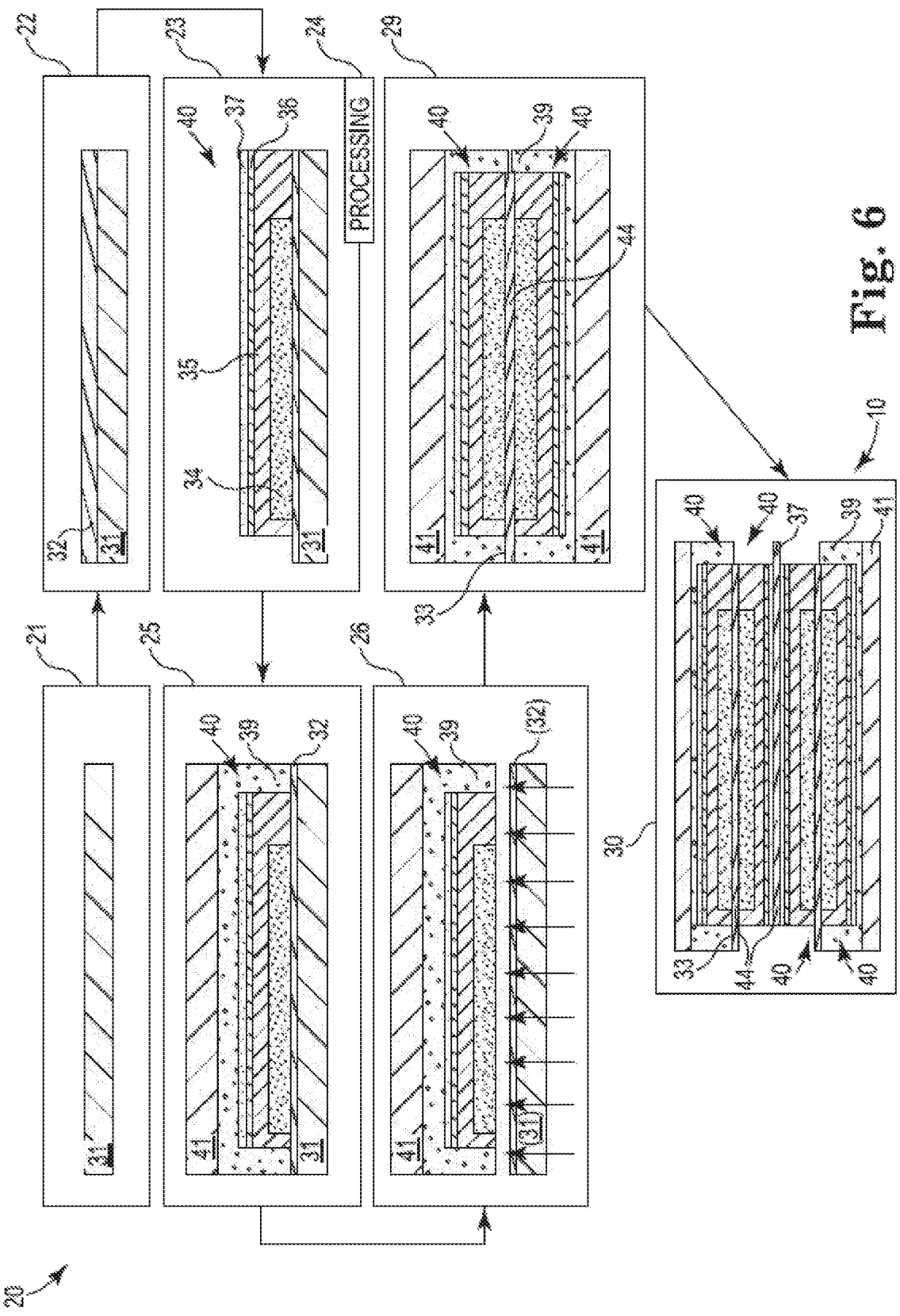
FIG. 6 is a process flow diagram for a battery system or assembly, with multiple cell encapsulation.

FIG. 6 is a process flow diagram illustrating method 20 for processing battery stacks or cells 40, with multiple cell encapsulation. In this example, a sacrificial base or release layer 32 is utilized (step 22), and there is no encapsulation layer in either thin-film deposition (step 23) or subsequent processing of battery stack 40 (step 24). Depending on application, a separate cathode collector layer 33 may also be avoided, as described above with respect to FIG. 5. Using a suitable conducting adhesive layer 44 to form cathode collector 33 when adjacent battery stacks 40 are bonded together (step 29).

In stacking step 30, the top or bottom transfer layers 41 are removed and pairs of adjacent battery stacks or cells 40 are bonded along the cathode collector interfaces, for example with additional conducting adhesive 44 between adjacent cathode collectors 37. Alternatively, the individual cell stacking order can be reversed, as described above, and additional temporary adhesive 39 and transfer layers 41 may also be removed, in order to stack an arbitrary number of battery cells 40. The multiply stacked cells 40 can then either be enclosed in a traditional battery casing, or encapsulated as a unit, as described below.

In some designs, all the cathode collector layers 33 in a particular battery system or assembly 10 are connected in parallel, as are the anode collector layers 37. Alternatively, individual battery stacks 40 (or pairs or stacks of cells 40) may have a reversed orientation, in order to provide one or more series couplings for higher output voltage. Thus, a wide range of different stacking configurations are encompassed, including different vertical layer ordering, and different horizontal (left and right) anode and cathode collector orientations, as long as shorts and other direct couplings across the anode and cathode layers are avoided in individual battery cells or stacks 40.

Figure 7:
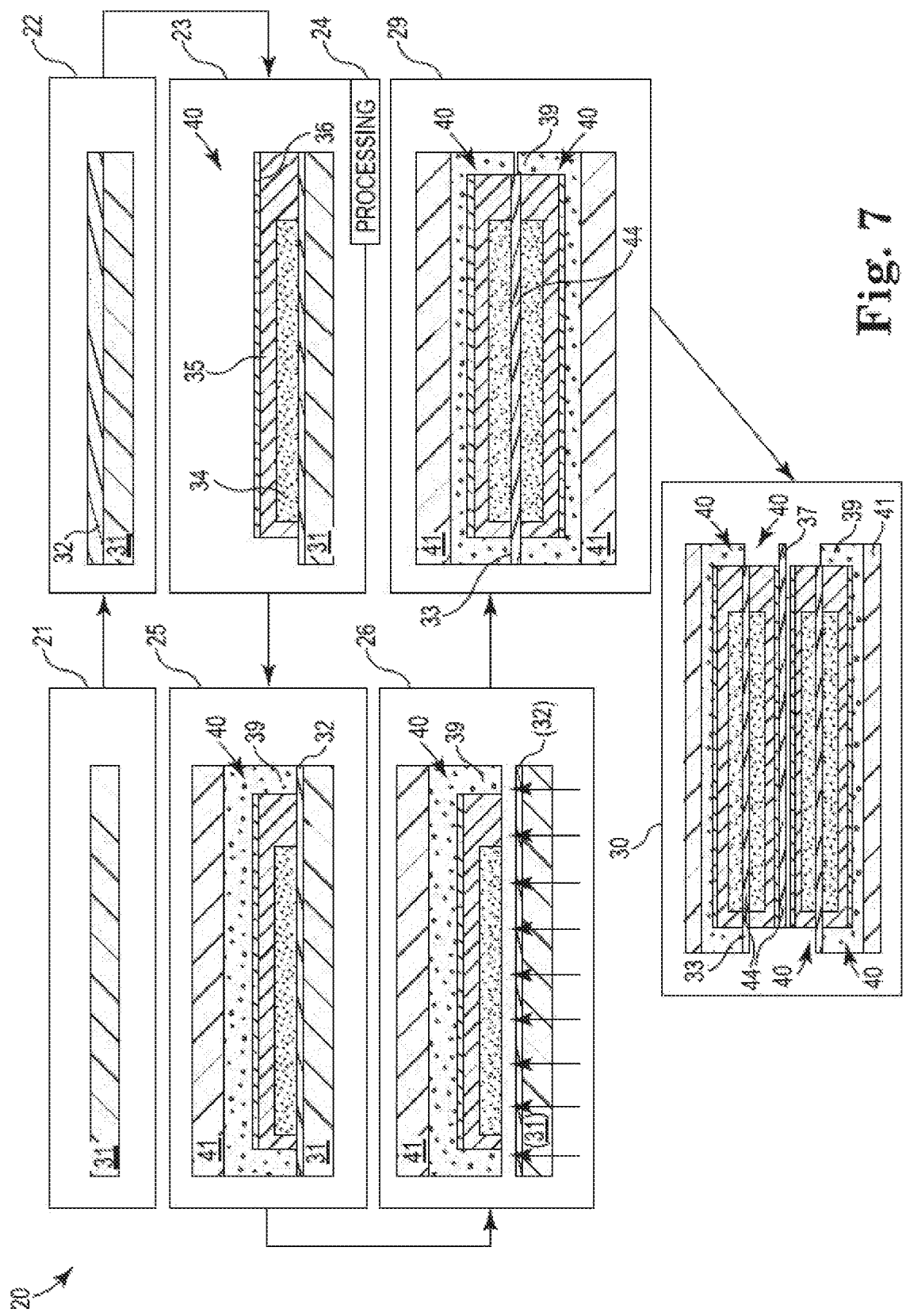
FIG. 7 is a process flow diagram for a battery system or assembly, with conducting adhesive anode and cathode collector layers.

FIG. 7 is a process flow diagram illustrating method 20 for processing battery stacks 40, with conducting adhesive anode and cathode collector layers. In this example, no separate cathode collector or anode collector layers 33 and 37 are formed in deposition step 23, and both process substrate 31 and sacrificial base layer 32 are removed in release step 25, before bonding adjacent battery stacks 40 (step 29).

In stacking step 30, pairs of adjacent battery stacks or cells 40 may be bonded together, as described above with respect to the example of FIG. 6. As shown in FIG. 7, however, there are no separate anode collector structures, and conducting adhesive 44 serves as both the cathode collector 33 and the anode collector 37. This provides a further decrease in the stacking height of the battery assembly, with an additional increase in power capacity and potential energy density, as compared to a more traditional design with the same form factor, or with the same mass and size envelope.

As shown in FIGS. 2-7, film transfer processing methods provide substantial advantages in the manufacture and structure of individual battery stacks 40, and for assembled multi-cell or multi-stack battery systems 10. In particular, where current technology requires high temperature anneal and crystallization process steps, few processing substrate materials are suitable, and these processing substrates do not necessarily provide commensurate performance advantages in any given battery system 10.

The use of a temporary process substrate 31 decouples a number of these processing concerns from the final battery assembly, allowing for thinner target (permanent) substrates to be utilized, or even none at all, depending upon final stacking configuration. This substantially reduces the inactive material in battery system 10, and increases the potential energy density. In one particular set of applications, for example, a processing substrate with a thickness of 25 µm or more can be replaced with a target substrate with a thickness of 5 µm or less, for example 2-3 µm, yielding a substantial reduction in inactive mass, and a substantial increase in corresponding potential energy density and power capacity. Alternatively, the z-height of the battery system can be reduced, within a given area, while maintaining or even increase total power output and storage capacity.

Figure 8:
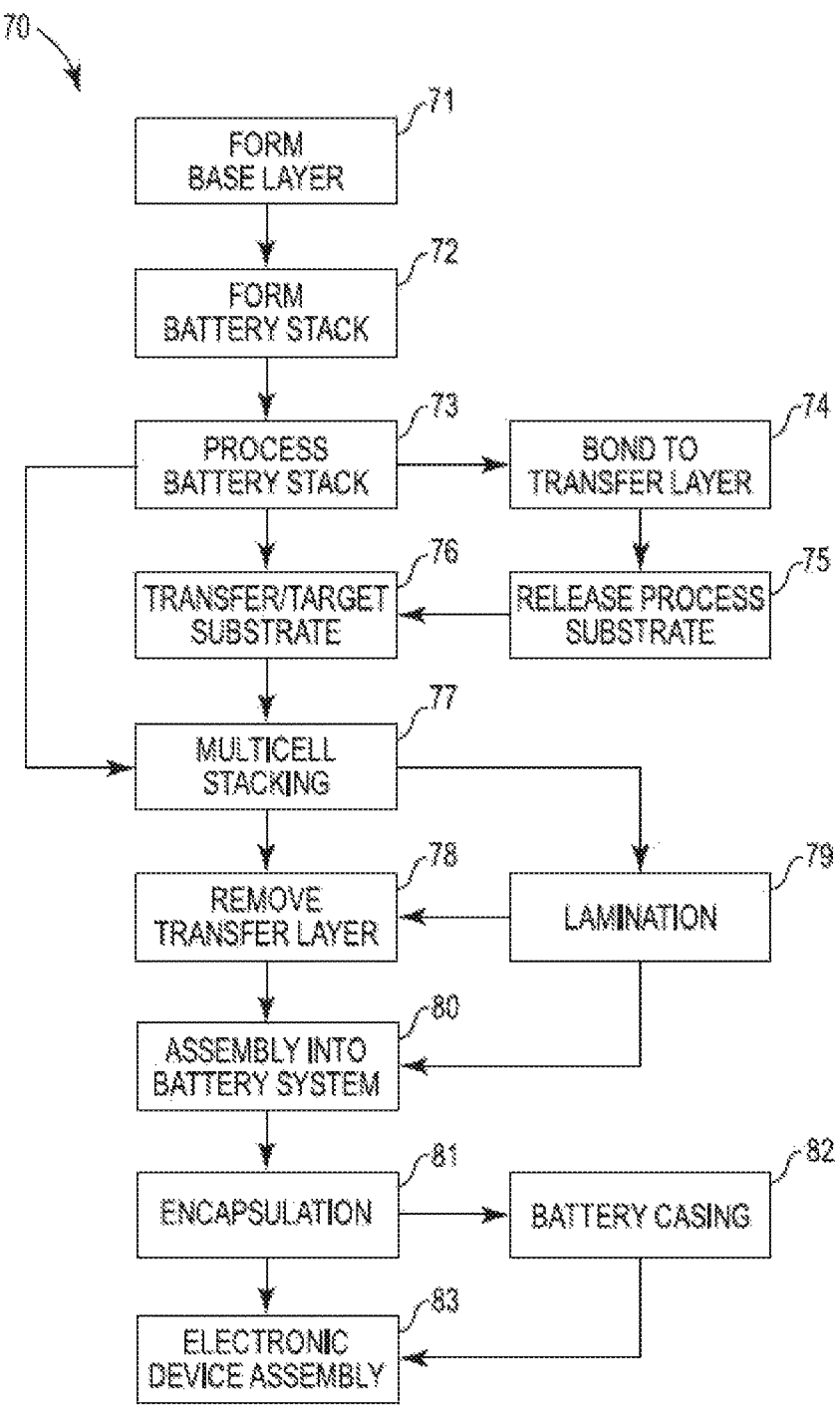
FIG. 8 is a block diagram of a method for forming a battery system or assembly.

FIG. 8 is a block diagram of method 70 for forming a battery assembly, for example battery system 10 with one or more individual battery stacks or cells 40, as described above. Method 70 may include one or more steps including, but not limited to, forming a base layer (step 71), forming a thin film battery stack on the base layer (step 72), processing the battery stack to achieve desired physical properties, and assembling the thin film battery stack into a battery system (step 80). Method 70 may also include one or more intermediate processing steps 74-79 and additional assembly steps 81-83, as described below.

Forming a base layer (step 71) and forming a thin film battery stack on the base layer (step 72), and other steps of method 70, may be performed according to any of the different examples of processing method 20, as described above with respect to FIGS. 2-7, or using other thin film processing steps known in the art. For example, the battery stack may comprise anode, cathode, and electrolyte layers with or without distinct collector layers, and the base layer may be formed on a temporary process substrate or a permanent substrate material, such as a pattern film substrate.

After the battery layers are deposited, the battery stack (or stacks) can be processed (step 73) to generate a crystalline structure in the anode or cathode layers, or other desired property, for example by thermal treatment or annealing. Additional chemical, thin film, and mechanical processes may also be applied, including encapsulation of the individual battery stacks or cells.

Depending on embodiment, the thin film battery stack may be bonded to a transfer layer (step 74), for transfer from the process substrate (step 75). The process substrate can be remove by etching, or by generating a phase transition in the base layer, in order to release the process substrate from the battery stack. The base layer can either be removed along with the process substrate, or kept together with the battery stack, for assembly into the completed battery system.

The battery stack is typically transferred to the transfer layer for bonding to a target or permanent substrate (step 76), or for assembly into a multi-cell stack (step 77). Generally, the permanent target substrate materials are retained with the battery stack, in the final assembly, but a permanent substrate is not required. Any remaining transfer layers can also be removed (step 78), either during the stacking process (step 77), or during final assembly of the battery system (step 80). A pattern film lamination can also be applied (step 79), as described above.

In some examples, the thin film battery cells are stacked bottom-to-bottom, with a pair of cathode collectors placed in an adjacent and electrically coupled relationship. Alternatively, one or more collector layers may be omitted, and the bare cathode layers themselves may be adjacent. In this technique, a bond can be formed between adjacent pair of cathode layers, for example using a conducting adhesive, which forms a (single) cathode collector for the two adjacent cathode layers.

Similarly, battery cells can also be stacked top-to-top, or with a reversed layer structure, so that the anode collector (or bare anode) layers are adjacent. A conducting bond can be formed between the adjacent collector layers, or between adjacent bare anode layers. Thus, the conducting bonds can be formed with a direct electrical connection between adjacent anode or cathode layers, with no other intervening collector layers.

Assembling the battery system (step 80) may include encapsulating the battery stack (step 81), inserting the battery stack into a pouch or casing (step 82), or both. Typically, the battery assemblies also provides additional features, for example electrodes or other connectors, which are configured for connecting the battery stack (or multilayer stack of cells) to an electronic device (step 83), as described below.

The battery stacks can either be individually encapsulated (step 81), or encapsulated as a multilayer stack. For example, a multilayer encapsulation system may be provided to form a substantially continuous barrier, surrounding the stack of individual thin film battery cells.

The battery stack (or stacks) can also be laminated together with a patterned film (step 79). The patterned film may include precut or patterned openings for accessing the connector, for example as described above with respect to FIG. 2, in order to make power connections to the electronic device.

Figure 9:
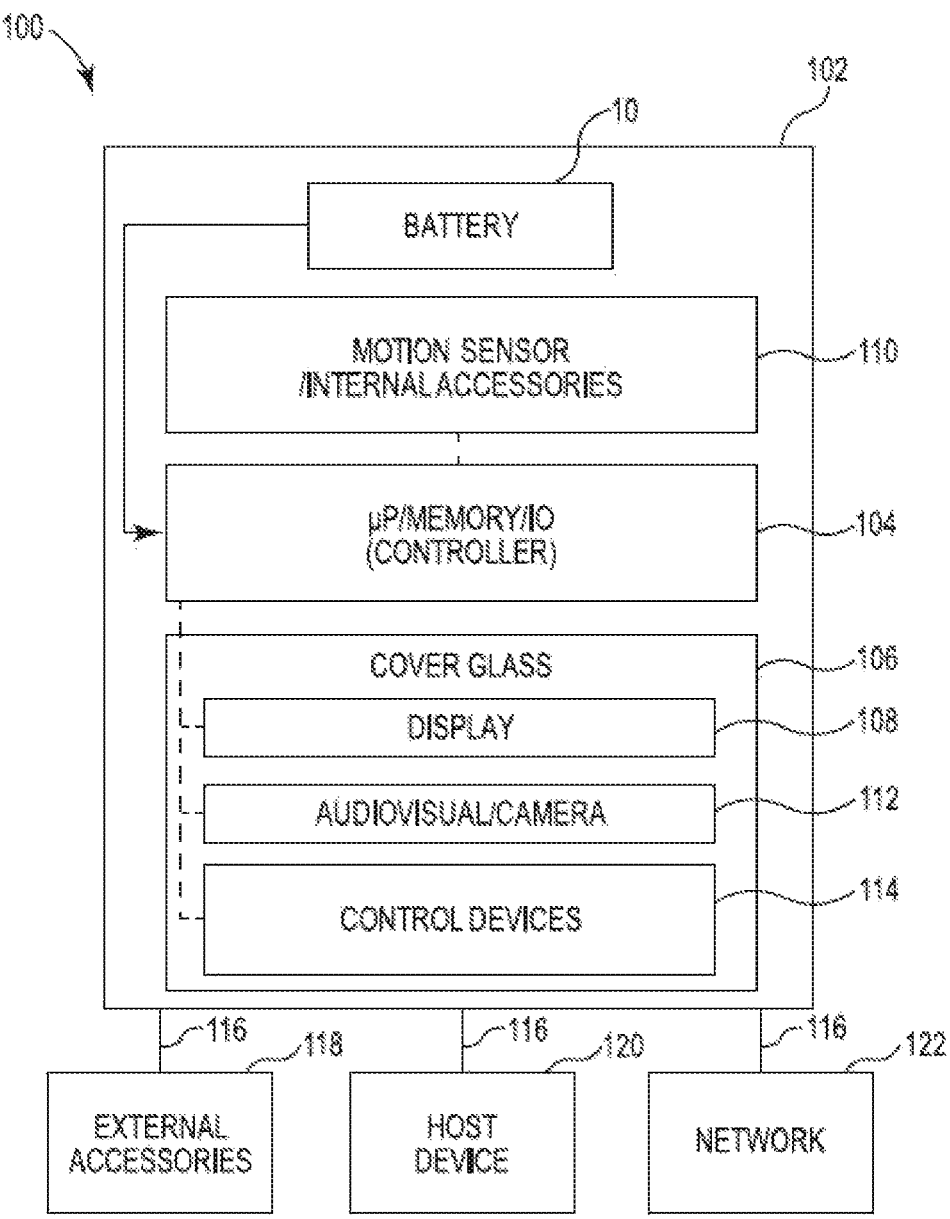
FIG. 9 is a schematic illustration of a representative electronic device incorporating a battery system or assembly.

FIG. 9 is a block diagram illustrating representative electronic device 100, for example with housing 102 and controller 104 coupled to battery system 10, in order to provide power management and operational control of device 100. In some applications, electronic device 100 is configured for use as a smartphone, tablet computer, or other mobile device. Alternatively, device 100 may be configured as a media player, digital assistant, game player, personal computer or computer display; a laptop, desktop, notebook, or handheld computer; a navigational or communications system; a power tool or other power equipment; or a power management component for use in a commercial, industrial, or transportation power system.

Housing 102 is provided to protect the internal components of device 100, and may be formed of a durable material such as aluminum and steel, or from metal, plastic, glass, ceramic, and composite materials, and combinations thereof. Cover glass 106 is typically formed of a glass or transparent ceramic material, for example silica glass or sapphire, or a clear plastic polymer such as acrylic or polycarbonate. In mobile device applications, cover glass 106 may include a display window for a touch screen, graphical interface or other display component 108.

Device 100 may also include a number of additional components powered by battery system 10, including, but not limited to, a motion sensor and other internal accessories 110, audiovisual and sensor features 112 including speakers, microphones, cameras, and lighting/indicator features (e.g., a light emitting diode or flash device), and various control devices 114, such as home, menu and hold buttons, volume controls, and other control elements, arranged variously with respect to housing 102 and cover glass 106.

As shown in FIG. 9, controller 104 is coupled in signal and power communication with battery system 10, and one or more of display 108, internal accessories 110, audiovisual features 112, and control devices 114. Controller 104 includes microprocessor and memory components configured to execute a combination of operating system and application firmware and software, in order to provide power management and device functionality including, but not limited to, data display, voice communications, voice control, media playback and development, internet access, email, messaging, gaming, security, navigation, transactions, and personal assistant functions. Controller 104 may also include additional input/output (I/O) components configured to support hard-wired, wireless, audio, visual, infrared (IR), and radio frequency (RF) connections 116, for one or more external accessories 118, host devices 120 and networks 122.

While this invention has been described with reference to exemplary embodiments, it will be understood by those skilled in the art that various changes can be made and equivalents may be substituted for elements thereof, without departing from the spirit and scope of the invention. In addition, modifications may be made to adapt the teachings of the invention to particular situations and materials, without departing from the essential scope thereof. Thus, the invention is not limited to the particular examples that are disclosed herein, but encompasses all embodiments falling within the scope of the appended claims.

We claim:

1. A battery system comprising:
    three or more thin film battery cells, encapsulated as a unit by an encapsulation layer, and arranged in an alternating stacked configuration forming a thin film battery stack, each of the thin film battery cells comprising:
        an anode layer;
        a cathode layer;
        a cathode current collector layer;
        an anode current collector layer; and
        an electrolyte layer between the anode layer and the cathode layer; and
    a planar thin film patterned layer, formed from plastic and attached to the thin film battery stack, the thin film patterned layer having pattern holes configured for electrical power connection to the thin film battery stack, the pattern holes including:
        a first pattern hole defined through a first end of the planar thin film patterned layer, the first pattern hole physically exposing the cathode current collector layer; and
        a second pattern hole defined through a second end of the planar thin film patterned layer, the second pattern hole physically exposing the anode current collector layer;
    wherein successive thin film battery cells of the alternating stacked configuration of the thin film battery stack have opposite orientations such that a first cathode current collector layer of a first thin film battery cell of the three or more thin film battery cells interfaces and couples, via a conductive adhesive layer, to a second cathode current collector layer of a second thin film battery cell of the three or more thin film battery cells and a first anode current collector layer of the first thin film battery cell of the three or more thin film battery cells interfaces and couples to a second anode current collector layer of a third thin film battery cell of the three or more thin film battery cells.

2. The battery system of claim 1, wherein the first pattern hole and the second pattern hole are defined through a plane defined by the thin film patterned layer.

3. The battery system of claim 1, wherein:
    the cathode layer has a crystalline structure characterized by a phase transition temperature; and
    the thin film patterned layer is not thermally stable at the phase transition temperature.

4. The battery system of claim 1, wherein:
    the cathode current collector layer is adjacent the cathode layer; and
    at least a pair of the cathode current collector layers are positioned in an adjacent and electrically coupled relationship within the alternating stacked configuration.

5. A device comprising:
    a display;
    a controller coupled to the display; and
    a battery assembly coupled to the controller and configured for powering the display, the battery assembly comprising:
        three or more thin film battery cells, encapsulated as a unit by an encapsulation layer, and arranged in an alternating stacked configuration forming a thin film battery stack, each of the thin film battery cells comprising:
            an anode layer;
            a cathode layer;
            a cathode current collector layer;
            an anode current collector layer; and
            an electrolyte layer between the anode layer and the cathode layer; and
        a planar thin film patterned layer formed at least in part from plastic and attached to the thin film battery stack, having pattern holes configured for electrical power connection to the thin film battery stack, the pattern holes including:
            a first pattern hole defined through a first end of the planar thin film patterned layer that physically exposes the cathode current collector layer; and
            a second pattern hole defined through a second end of the planar thin film patterned layer that physically exposes the anode current collector layer;
        wherein successive thin film battery cells of the alternating stacked configuration of the thin film battery stack have opposite orientations such that a first cathode current collector layer of a first thin film battery cell of the three or more thin film battery cells interfaces and couples via a conductive adhesive to a second cathode current collector layer of a second thin film battery cell of the three or more thin film battery cells and a first anode current collector layer of the first thin film battery cell of the three or more thin film battery cells interfaces and couples to a second anode current collector layer of a third thin film battery cell of the three or more thin film battery cells.

6. The device of claim 5, wherein the anode current collector layer and/or the cathode current collector layer comprise a conducting adhesive.

7. The device of claim 5, wherein the thin film patterned layer comprises one or more of polymers, metals, glass, ceramic or refractory materials.

8. The device of claim 5, wherein a thickness of the thin film patterned layer is between about 20 microns and about 10 microns.

9. The device of claim 5, wherein a thickness of the thin film patterned layer is between about 10 microns and about 5 microns.

10. The device of claim 5, wherein a thickness of the thin film patterned layer is less than about 5 microns.

11. The device of claim 5, wherein the cathode layer and/or the cathode current collector layer comprise lithium and cobalt.

12. The device of claim 5, wherein the anode layer and/or the anode current collector layer comprise one or more of lithium, lithium cobalt oxide, lithium iron phosphate, lithium metal phosphates, lithium manganese oxide, carbon, graphite, or graphite infused with lithium ions.

13. The device of claim 5, wherein the electrolyte layer comprises one or more of ethylene carbonate containing lithium ion complexes or diethyl carbonate containing lithium ion complexes.

14. The device of claim 5, wherein:
    the electrolyte layer further comprises a separator material; and
    the separator material comprises one or more of polyethylene lithium ion transport materials, lithium phosphate, lithium phosphorous, lithium phosphorous oxynitride (LiPON), or carbon nanotube materials.

15. The device of claim 5, further comprising an encapsulant disposed about the thin film battery stack on the thin film patterned layer.

16. The device of claim 5, further comprising a battery pouch, wherein the battery assembly is disposed within the battery pouch.

* * * * *